United States Patent [19]

Fricker

[11] 4,199,853
[45] Apr. 29, 1980

[54] METHOD OF PROTECTING A PIPE

[75] Inventor: Hans Fricker, Sulz-Attikon, Switzerland

[73] Assignee: Sulzer Brothers Limited, Winterthur, Switzerland

[21] Appl. No.: 935,111

[22] Filed: Aug. 21, 1978

[30] Foreign Application Priority Data

Sep. 13, 1977 [CH] Switzerland ..................... 11140/77

[51] Int. Cl.² ............................................. B23P 17/00
[52] U.S. Cl. ......................................... 29/415; 29/416;
29/455 R; 29/509; 29/525; 138/140; 175/325;
228/135; 285/158; 308/4 A
[58] Field of Search ...................... 29/455 R, 415, 417,
29/416, 525, 509; 285/158, 286, 241; 228/126,
135; 138/140; 175/325; 308/4 A

[56] References Cited

U.S. PATENT DOCUMENTS

| 1,613,039 | 1/1927 | McLaren | 308/4 A |
|---|---|---|---|
| 2,123,265 | 7/1938 | Wattie | 29/416 X |
| 2,556,033 | 6/1951 | Flumerfelt | 29/416 |
| 2,602,512 | 7/1952 | Baker | 308/4 A X |
| 2,877,062 | 3/1959 | Hall et al. | 308/4 A |
| 2,878,771 | 3/1959 | Grau | 29/417 X |
| 2,882,376 | 4/1959 | Charbonneau | 29/509 UX |
| 3,222,770 | 12/1965 | Braid | 29/417 X |
| 3,507,525 | 4/1970 | Sable | 308/4 A X |
| 3,572,770 | 3/1971 | Kagi | 285/158 |

Primary Examiner—Charlie T. Moon
Attorney, Agent, or Firm—Kenyon & Kenyon

[57] ABSTRACT

A C-shaped open base element of sheet metal is used to form a protective sleeve about a pipe mounted in a mounting. The element is bent about the pipe and welded together to form the sleeve. Wedges are used to secure the formed sleeve to the pipe. Shoulders are provided on the sleeve to stiffen the sleeve in the unbent regions and to prevent axial displacement of the sleeve in the mounting.

13 Claims, 10 Drawing Figures

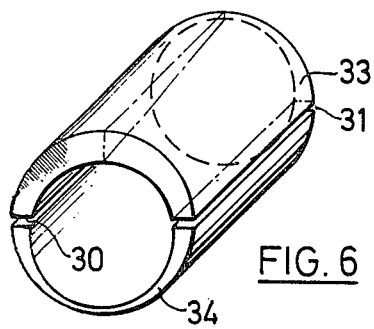
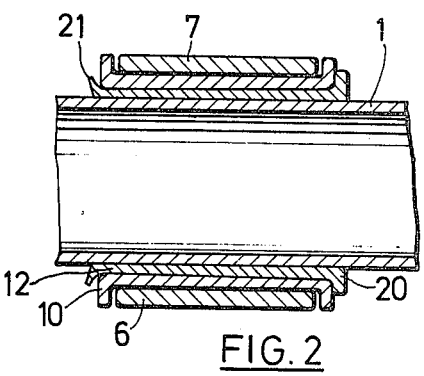
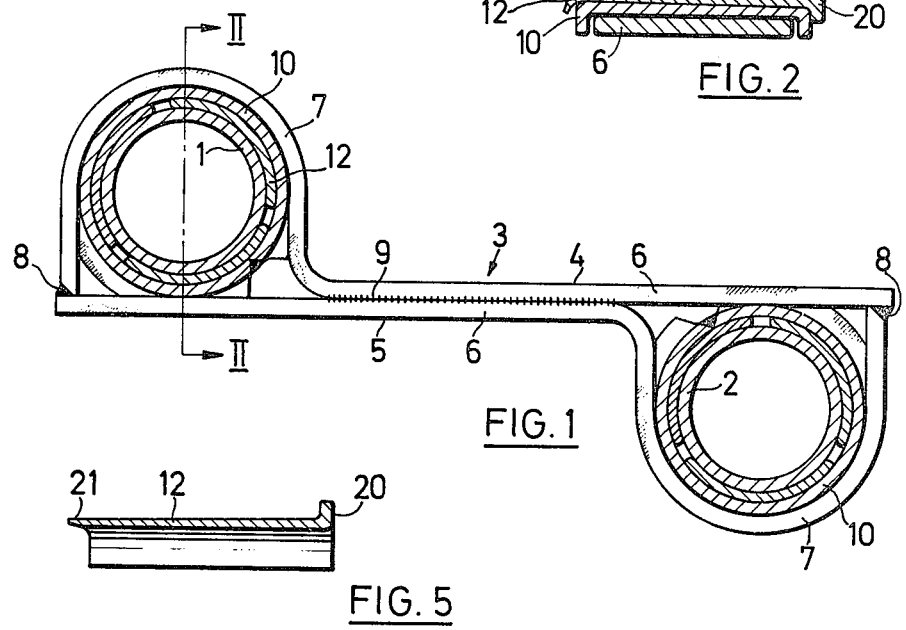
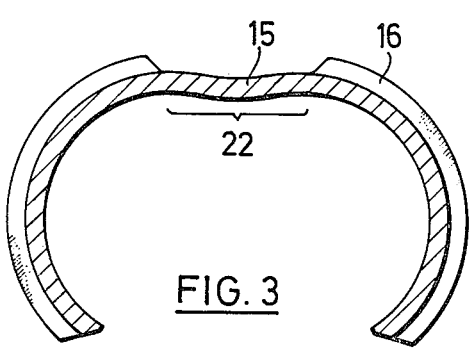
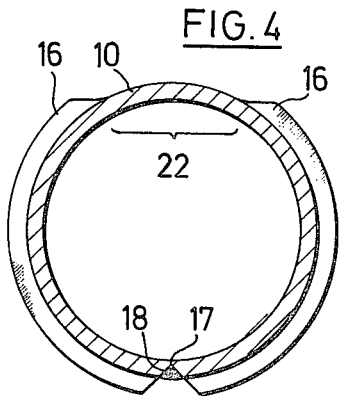

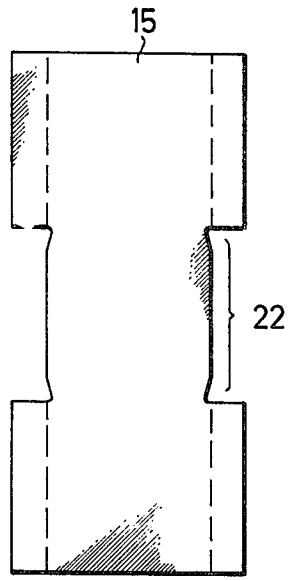
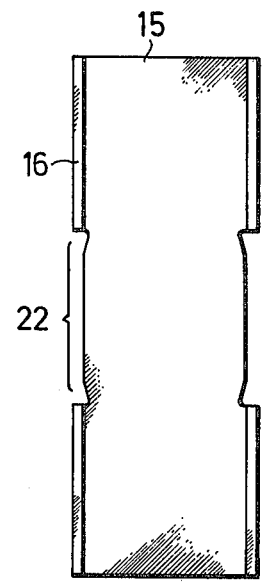
FIG. 7  FIG. 8
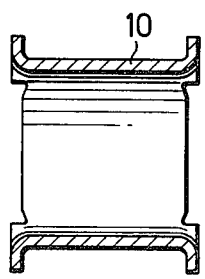
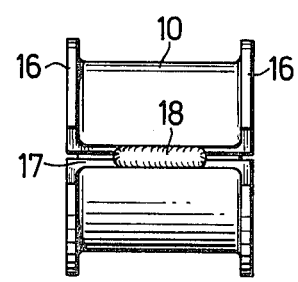
FIG. 9  FIG. 10

METHOD OF PROTECTING A PIPE

This invention relates to a method of protecting a pipe and a wear protective element therefor. More particularly, this invention relates to a method of preparing a wear protective arrangement for a pipe.

Heretofore, it has been known to provide pipes with wear protective arrangements where the pipes are subject to wear in the region of their mountings. In one known arrangement, as described in U.S. Pat. No. 3,572,770, the wear protective arrangement includes a sleeve which is pressed onto a pipe by wedges at a point at which the pipe is to be protected. While this arrangement has found acceptance in practice, there is an intrinsic disadvantage in that the sleeve must always be threaded on the pipe in advance or must be built into the mounting. In some cases, this leads to difficulties in design and fabrication.

Accordingly, it is an object of the invention to provide a wear protective arrangement which can be installed on a pipe after the pipe is put in place.

It is another object of the invention to provide a relatively simple wear protective arrangement for a pipe.

It is another object of the invention to provide a relatively simple method of mounting a pipe in a wear protective arrangement.

Briefly, the invention provides a method of protecting a pipe as well as a wear protective element.

The method comprises the steps of moving a C-shaped open base element radially over a pipe of circular cross-section, bending the element about the pipe to form a ring-shaped sleeve, thereafter welding the ends of the element together approximately along a generatrix and then inserting at least two wedge shaped arcuate shells between the pipe and sleeve to wedge the sleeve onto the pipe.

In this way, it is possible to place the sleeve around an already installed pipe next to the mountings provided for the pipe, to deform the sleeves and to weld the ends without a need to thread the sleeves from an end of the pipe.

In various embodiments, a number of advantageous steps can be used to mount the C-shaped element in place. For example, in the case of small lots, the base element can advantageously be made from a section of pipe (i.e., a tube section) by shaping the inside of the pipe conically, cutting the pipe open along a generatrix and opening the pipe up by bending. The conical shape can be obtained in a particularly economic manner by flaring the pipe out over a tapered plug. For large quantities, for which it pays to make a die, the base element can advantageously be stamped of sheet metal and formed into the desired shape by pressing. By forming at least one shoulder at the end, which is preferably produced by chip-removing machining of the outside of the sleeve, it is easy to provide security against axial displacement of the sleeve in the mounting.

In order to limit deformation when the base element is bent to a small region on the surface of the sleeve, the bending resistance moment can be reduced in a region diametrically opposite to the cut. This can advantageously be done by local removal of the shoulder or shoulders.

An advantageous procedure for installing the sleeve by means of the wedge-like shells is to first position the wedge-shaped shells at their final position on the pipe and to thereafter slide and press the welded together base element axially over the shells by means of pliers supported on the shells. In this manner, the axial forces are reduced to about one-half as compared to driving wedges into a sleeve fixed relative to the pipe.

In another embodiment, the sleeve is formed with a substantially cylindrical inside surface to define a gap between the sleeve and the pipe. In this case, an even number of shells can be pressed alternatively from the opposite ends between the pipe and sleeve. In this embodiment, the danger of an axial displacement of the sleeve is avoided and particularly without the mentioned shoulders.

In the above-described embodiment, the wedge-shaped shells can be formed by cutting up a cylinder which is bored out with a small inclination to the longitudinal axis into sectors. In this case, very uniform tension can be obtained in the sleeve by a wedge shape which can geometrically be generated in a simple manner.

The wedge-shaped shells can be protected against damage if they have a shoulder on their thicker side. In addition, the shells can each be secured against displacement by bending up an extension at the thinner end.

A certain amount of elasticity can be obtained in the sleeve to allow give way should the wedge angles of the shells not agree, if the bent-together sleeve is welded together only over a middle portion of the length of a generatrix.

The wear protective element has a pair of concave sides which define half-ring pieces disposed in facing relation to each other while being integrally joined along a deformable region. These pieces are spaced from each other at the free ends a distance approximately equal to the diameter of a pipe to be protected.

The free ends of the element can be pre-machined to define a V-shaped seam when joined together in order to receive a weld. Also, each half-ring piece can be provided with at least one shoulder over a part of the circumferential periphery in order to stiffen the piece.

The element may also have a chromium carbide layer on the outside for protection against welding to the mounting in a reducing atmosphere.

These and other objects and advantages of the invention will become more apparent from the following detailed description and appended claims taken in conjunction with the accompanying drawings in which:

FIG. 1 illustrates a cross-sectional view through two pipes which are connected by means of a mounting and, which are protected by a wear protection arrangement in accordance with the invention;

FIG. 2 illustrates a longitudinal cross-sectional view taken on line II—II of FIG. 1;

FIG. 3 illustrates a cross-sectional view through a wear protective element opened in C-fashion in accordance with the invention;

FIG. 4 illustrates a cross-sectional view of the wear protective element of FIG. 3 closed and welded together;

FIG. 5 illustrates a longitudinal cross-sectional view through a wedge-shaped shell in accordance with the invention;

FIG. 6 illustrates the basic shape of a corresponding pair of two wedge-shaped shells, diagrammatrically and in a perspective view;

FIG. 7 illustrates a punched cut of a base element stamped in accordance with the invention from sheet metal;

FIG. 8 illustrates the stamped part of FIG. 7 after a first bending operation;

FIG. 9 illustrates the stamped part of FIG. 8 in final form as a closed sleeve in a longitudinal cross-section; and FIG. 10 illustrates a view of the sleeve of FIG. 9 welded together.

Referring to FIGS. 1 and 2, two pipes 1, 2 are held at a fixed distance by a mounting which consists of two similar brackets 4,5 of strip steel. Each bracket 4,5 consists of a straight leg portion 6 and a bent U-shaped portion 7. The brackets 4,5 are welded together by two crosswise welds 8 and two lengthwise welds 9. The pipes 1, 2 are installed inside the U-shaped portions 7 and are each protected from wear, especially fretting corrosion, by a sleeve 10. Each sleeve 10 has a slight amount of play in a U-shaped portion 7 and is tightened on a pipe 1, 2 by three wedges 12.

As shown in FIG. 3, each of the sleeves 10 is made from a C-shaped, one-piece open base element 15, which has a pair of concave sides defining half-ring pieces disposed in facing relation to each other and a central deformable region integrally joining the concave sides to each other at a generatrix. Each half-ring piece also has a pair of outwardly projecting shoulders 16 on each end to stiffen the piece. The free ends of each pipe are spaced from each other at a distance approximately equal to the diameter of a pipe 1, 2 and are premachined with a chamfer (FIG. 3) to define a V-shaped seam when joined together at a generatrix 17 (FIG. 4). A weld 18 is used to join the free ends together and, thus, form the sleeve 10. The shoulders 16 are removed opposite the weld 18 in a circumferential section 22 of about 50° extent. The resistance moment to bending of the base element 15 is therefore considerably smaller in this region 22 than in the remainder of the circumference on which the shoulders 16 are present.

Each wedge 12 is pressed in between a sleeve 10 and a pipe 1, 2. As indicated in FIG. 5, each wedge 12 is in the form of an arcuate shell with a wedge-shaped or tapering cross-section. The shells 12 can be made from a cartridge, turned conically on the outside, by forming three axial cuts offset by 120°. The shells 12 can also be made from a rolled section with a wedge-shaped profile by bending the section round.

The thicker end of each shell 12 is formed with a shoulder 20 to provide an enlarged attack or abutment surface for a tool (not shown) with which the shells 12 are held when the sleeve 10 is pushed on. It is possible, of course, to dispense with this shoulder.

On the opposite thinner side, the shell 12 has a tab-like extension 21, which is bevelled on the inside so that a bending tool can be inserted between the shell 12 and the pipe 1, 2 to bend the extension 21 up for securing the sleeve 10 in a mounting (6,7).

In order to form the element 10, the interior surface of a tube section is shaped into a conical shape preferably corresponding to the conicity of the wedge-shaped shell 12. The tube section is then cut along a generatrix and bent open or is expanded by pressing in a plug. If necessary, the sleeve 10 can be heat-treated after being flared out.

However, it is also possible to make the sleeve 10 cylindrical on the outside and inside and to press in wedge-shaped shells 33, 34 (FIG. 6) in pairs alternatingly from both sides. According to FIG. 6, a cylinder is bored out at an angle, so that a tube with variable wall thickness is produced. The tube is then cut by two radial cuts 30, 31 into the two shells 33, 34 in such a manner that their cross-section is alternatingly larger at one end than at the other, and that the two surfaces of the cuts, located in a medium wall thickness range, are approximately rectangular. The shells 33, 34 are pressed into the sleeve 10 from opposite sides, whereby the sleeve 10 is initially slightly deformed into an oval shape. In this case, securing means, such as tabs that can be bent up, may also be provided.

In this embodiment, the axis of the sleeve 10 is slightly inclined to the axis of the pipe 1 because of the inclination of the bore of the cylinder shells 33, 34. This may have to be taken into consideration in arranging the mounting.

If large quantities are made, it may be advantageous to fabricate the sleeve 10 by stamping and bending from sheet metal. As shown in FIG. 7, it is advantageous to make the stamping of the base element 15 in the shape of an H; the corresponding corners can be rounded in order to avoid high peak stresses and cracks. After punching, the shoulders 16 are bent up, as shown in FIG. 8, and subsequently, the half cylinders of the sleeve 10 are made round (FIG. 9) so that a base element 15 is produced which resembles that of FIG. 3. FIG. 9 then shows an empty sleeve 10 in the finished, bent condition; FIG. 10 shows a side view of the sleeve 10 with a weld 18, which extends only over a middle part of the cylinder. With a welded seam of this nature, the sleeve 10 remains more elastically and plastically deformable, so that even if unilaterally arranged wedge-shaped shells 12 are used, a conical shape of the inside surface can be eliminated. However, the cylindricity of the outside surface of the sleeve 10 is then lost. If necessary, this can be compensated by a suitable conical shape of the mounting 3.

Depending on the accuracy requirements, it may be advantageous to press the two cylinder halves of the sleeve 10 together into abutting relation for welding or, to place inserts between the free ends and to perform a tack weld before the seam is made.

The wear protection sleeve 10 is installed, for instance, as follows:

The base element 15 (FIG. 3) is pushed over the pipe 1 at a suitable point and is pressed together, for example with pliers having an approximately circular mouth. If required, inserts can be placed between the free ends of the element 15 in order to obtain the desired circumference. After laying down a ceramic or copper strip, the weld 18 is made, optionally after tack-welding first, for instance, over the entire width of the sleeve 10.

Next, the wedge-shaped shells 12 are placed around the pipe at the point where the sleeve 10 is to be located, for instance, attached to two jaws of pliers (not shown), which engage the pipe. From the side opposite the two jaws of the pliers, the sleeve 10 is now pushed over the shells 12 and is finally pushed on with further jaws of the pliers until the necessary radial tension is reached; in the extreme case, until their one side rests against the shoulder 20 of the shells 12. Then, a tool, which is fixed on the one side at the shoulder 20 of the wedge-shaped shell 12, is placed under the extension 21 and bends the extension 21 outward, so that the shells 12 protect the sleeve 10 from axial displacement.

If pipes are to be held at a given distance from each then sleeves 10 are wedged at the same height of the pipes, and two brackets 4, 5 are arranged around the sleeves 10, as shown in FIG. 1, and welded together. The brackets 4, 5 have the advantage that the pipe spacing can be chosen as desired. It is then possible to allow the cutting-off of the straight leg portions 6 of the brackets 4, 5 to a suitable length and the making of the welds 8, 9 follow each other in any sequence desired.

What is claimed is:

1. A method for protecting a pipe comprising the steps of
   moving a C-shaped open base element radially over a pipe of circular cross-section;
   bending the element about the pipe to form a ring-shaped sleeve;
   thereafter welding the ends of the element together approximately along a generatrix; and
   inserting at least two wedge shaped arcuate shells between the pipe and sleeve to wedge the sleeve onto the pipe.

2. A method as set forth in the claim 1 which further comprises the steps of shaping an interior surface of a tube section into a conical shape, cutting the tube section along a generatrix and bending the tube section open to form the C-shaped element.

3. A method as set forth in claim 2 which further comprises the step of expanding the tube section over a plug to shape the interior surface into the conical shape.

4. A method as set forth in claim 2 which further comprises the step of reducing the bending resistance of the sleeve in a region diametrically opposite the cut.

5. A method as set forth in claim 1 which further comprises the step of chip-removing machining of the outside of the C-shaped element to form at least one shoulder at the end of the element.

6. A method as set forth in claim 5 which further comprises the step of reducing each shoulder in a region diametrically opposite the cut to reduce the bending resistance thereof.

7. A method as set forth in claim 1 which further comprises the step of axially pressing the wedges onto the sleeve with pliers supported on the shells.

8. A method as set forth in any one of claims 1 to 3, 5 and 6 wherein the sleeve has a substantially cylindrical inside surface and the shells are of an even number, and which further comprises the step of inserting the shells between the pipe and sleeve from alternating ends of the sleeve.

9. A method as set forth in claim 8 which further comprises the step of cutting a cylinder into sectors to form the shells, wherein the cylinder has a bore with a slight inclination to a longitudinal axis thereof.

10. A method as set forth in claim 1 which further comprises the step of forming a shoulder on a thick side of each shell.

11. A method as set forth in claim 10 which further comprises the step of forming a thin side on each shell to permit outward radial bending thereat.

12. A method as set forth in claim 1 wherein the C-shaped element is made of sheet metal and is pressed into an open shape from a stamping.

13. A method as set forth in claim 1 wherein the ends of the element are welded together only along a central part of the element to allow elastic flexing at the longitudinal ends of the sleeve.

* * * * *